United States Patent [19]

Clay

[11] Patent Number: 5,245,265
[45] Date of Patent: Sep. 14, 1993

[54] SYSTEM TO CONTROL A MOTOR FOR THE ASSEMBLY OR DIS-ASSEMBLY OF TWO MEMBERS

[75] Inventor: Robert A. Clay, Great Yarmouth, England

[73] Assignee: Frank's International Ltd., Norfolk, Great Britain

[21] Appl. No.: 730,968

[22] PCT Filed: Jan. 26, 1990

[86] PCT No.: PCT/GB90/00113
§ 371 Date: Jul. 26, 1991
§ 102(e) Date: Jul. 26, 1991

[87] PCT Pub. No.: WO90/08994
PCT Pub. Date: Aug. 9, 1990

[30] Foreign Application Priority Data
Jan. 28, 1989 [GB] United Kingdom ............... 8901918

[51] Int. Cl.⁵ ............... B23P 19/06; G05B 15/02; G05D 17/02
[52] U.S. Cl. ............... 318/568.11; 318/569; 318/432
[58] Field of Search ........... 318/568.1, 568.11, 568.22, 318/569, 600, 432, 433; 73/862, 862.08, 862.16, 862.23, 862.25, 862.33, 862.35; 81/469, 470; 173/12

[56] References Cited
U.S. PATENT DOCUMENTS

| | | | |
|---|---|---|---|
| 3,745,820 | 7/1973 | Weiner | 73/139 |
| 4,091,451 | 5/1978 | Weiner et al. | 364/506 |
| 4,210,017 | 7/1980 | Motsinger | 73/139 |
| 4,446,745 | 5/1984 | Stone et al. | 73/862.25 |
| 4,959,797 | 9/1990 | McIntosh | 364/508 |
| 4,961,035 | 10/1990 | Inaba et al. | 318/600 |
| 4,987,806 | 1/1991 | Lehnert | 81/469 |
| 4,995,145 | 2/1991 | Eshghy | 29/407 |
| 5,039,073 | 8/1991 | Reichard et al. | 267/140.1 |
| 5,061,885 | 10/1991 | Fukuhara | 318/434 |
| 5,105,519 | 4/1992 | Doniwa | 29/407 |

FOREIGN PATENT DOCUMENTS

| | | |
|---|---|---|
| 1575872 | 10/1980 | United Kingdom . |
| 1592984 | 7/1981 | United Kingdom . |
| 1594478 | 7/1981 | United Kingdom . |
| 2083248 | 3/1982 | United Kingdom . |
| 2102152 | 1/1983 | United Kingdom . |

*Primary Examiner*—Bentsu Ro
*Attorney, Agent, or Firm*—Collard & Roe

[57] ABSTRACT

A system for controlling the operation of a motor being used for the rotational assembly or dis-assembly of two members, the system comprising means monitoring, and generating a digital or analogue signals representative of the state of the two members and means relaying the representative signal in a digital form to a first processor (6) means relaying the signal in an analogue form to a second processor (11); the first processor comprising a computer which in use, digitally analyses the representative signal and is so programmed as to generate a first control signal in response to the representative signal; the second processor comprising means converting the first control signal into analogue form and means comparing it with the analogue representative signal and generating second control signal representative of the difference between the first control signal and the representative signal; the second processor being so connected as to transmit the second control signal to the motor control means.

8 Claims, 6 Drawing Sheets

MAKE-UP CONFIGURATION (ASSEMBLY)

FIGURE 1A. MAKE-UP CONFIGURATION (ASSEMBLY)

FIGURE 1B. BREAK-OUT CONFIGURATION (DIS-ASSEMBLY)

FIGURE 2. OLD CIRCUIT (TYPICAL)

FIGURE 3. NEW CIRCUIT

FIGURE 4. TORQUE–TURN GRAPH

FIGURE 5. TORQUE–TIME GRAPH

FIGURE 6. SPEED-TURNS GRAPH

FIGURE 7. TORQUE-TURN GRAPH

FIGURE 8. SPEED-TURNS GRAPH

SYSTEM TO CONTROL A MOTOR FOR THE ASSEMBLY OR DIS-ASSEMBLY OF TWO MEMBERS

BACKGROUND OF THE INVENTION

The invention relates to a system for controlling the operation of a motor, and is more particularly of application to the screwing together of tubular components, for example, adjacent sections of tubing string or sub assemblies to the top of a tubing string.

Tubing components are conventionally screwed together using equipment which basically comprises an upper tong and a lower tong. The lower tong has a set of fixed jaws which, in use, securely grip one of the tubing components (usually the top section of a tubing string), whilst the upper tong includes a set of rotatable jaws which firmly grip the other tubing component(s).

The output of a motor, which is usually a hydraulic motor, is connected to the rotatable jaws in such a way that the motor is operable to rotate the jaws, and hence, in use, the tubing component gripped by them. The motor is used to both screw one component into the other, and to tighten them one against the other. Alternatively the motor is used to loosen the components and unscrew the components.

Problems can arise if the threads do not properly inter-engage, as a result of, for example, one of the threads being cross-threaded or of the contamination of the threads with grit. In such a situation, operation of the motor to screw the two components together may not produce an adequately secure connection, and may result in the damage, by, for example, galling of the threads.

In an attempt to reduce the risk of this happening, it is known to link the motor to a monitoring system. The monitoring system operates a device, usually a hydraulic by pass valve. A load cell is used to provide a measure of the torque being exerted, in use, on the tubing component in the upper tong. When the torque exerted passes a pre-determined maximum value, the system operates to shut down the motor.

This approach has the disadvantage that there is no automatic control of the operational speed of the motor or applied torque. Thus, if, for example, the thread on one of the components failed completely, resulting in the sudden virtually complete loss of any resistance to the tightening of the components, the motor may rotate the component held in the upper tong at a dangerously high speed.

In one broad aspect, according to the invention, there is provided a system for controlling the operation of a motor being used for the rotational assembly or dis-assembly of two members, the system comprising means monitoring, and generating a digital or analogue signal representative of the state of the two members, means relaying the representative signal in a digital form to a first processor; and means relaying the signal in an analogue form to a second processor; the first processor comprising a computer, which, in use, digitally analyses the representative signal and is so programmed as to generate a first control signal in response to the representative signal; the second processor comprising means converting the first control signal into analogue form, and means comparing it with the analogue representative signal and generating a second control signal representative of the difference between the first control signal and the representative signal; the second processor being so connected as to transmit the second control signal to the motor control means.

Such a system may be used to control a motor which is operable to rotate, for example, a section of tubing string, and the monitoring means preferably comprise means monitoring the load on the tubing by measuring the torque being exerted by the motor.

In this case, there may also, with advantage, be provided means measuring and generating signal representative of, the angular position of the tubing, the representative angular signal being transmitted, in use, to the first processor. The position measuring means may, for example, include a turn counter which, in use, generates a digital representative signal. The signal representative of angular position may be processed to give an indication of the rotational speed of the tubing being rotated.

The motor may be a hydraulic motor, in which case the motor control means may comprise an electrically actuated servo valve.

If the signal representative of the state of the two members is in an analogue form, the computer may include means converting the signal into digital form.

In another broad aspect, the invention provides a method of controlling a motor having control means operable in response to an appropriate control signal, and being used for the rotational assembly or dis-assembly of two members, the method comprising the steps of:

(a) monitoring the state of the two members and generating a signal representative of the state of the two members;

(b) digitally analysing the representative signal;

(c) generating the first analogue control signal in response to the analysis of the representative signal and in accordance with a pre-determined set of instructions;

(d) ensuring that the representative signal is in analogue form;

(e) comparing the first control signal with the representative signal and generating a second control signal corresponding to the difference between the first control signal and the representative signal; and (f) transmitting the second control signal to the motor control means.

This method may be used in a process of rotatably tightening together two members, using the motor to rotate one member relative to the other, in which the state of the member is monitored by monitoring the torque exerted by the motor on one member relative to the other, and which method includes the steps of:

(a) monitoring the relative angular displacement of the first member;

(b) generating a signal representative of the relative angular displacement of the member;

(c) digitally analysing the displacement signal; and (d) providing that the first control signal is generated in response to both the representative signals.

The invention additionally provides a method of determining whether the maximum shoulder torque between two members being fitted together, by rotating and tightening them one against the other, has been reached or passed; the method comprising the steps of:

(a) monitoring the relative angular displacement between the members, and the amount of torque being exerted, as the members are rotatably tightened.

(b) when the torque reaches a pre-determined level, calculating the rate of change (first differential) of torque with respect to angular displacement; and (c) determining whether or not the rate of change is of an acceptable value, i.e. a value characteristic of the case in which the maximum shoulder torque has been reached or passed.

Such a method may include the additional step of halting the process of tightening the two members together if the rate of change is not of an acceptable value.

In the case of two tubing components which are being screwed together, the extent of movement of one component towards the other is limited by a stop formed on one of the components. Where the components are tubing sections, the stop is usually formed as a shoulder which is an integral part of the box containing the screw-threaded portion of one of the sections.

As the two sections are screwed together, the shoulder will eventually abut the end of the other section, causing a rapid increase in the resistance encountered to the relative tightening rotation movement of the sections.

On a graph of torque against relative angular displacement of the two sections this is manifested as a sudden increase in the applied torque. Opinions vary as to the precise position on the graph of the maximum shoulder torque point, but it is generally accepted that the gradient of the graph after the maximum shoulder torque is considerably greater than that of the graph before the maximum shoulder torque.

It is possible to obtain an idea of whether or not the two sections are properly connected by ascertaining whether or not the maximum shoulder torque has been reached.

Conventional attempts to do this involve the use of equipment which monitors the torque being exerted by the motor, and which determines that the maximum shoulder torque has been reached in response to a sudden increase in the torque exerted by the motor. However, the accuracy of this approach is compromised by the random variation in adjacent torque readings, such variations being caused by, for example, electrical "noise" in the torque monitoring equipment or by the thread condition.

Using the method according to the invention, the problems arising from noise can be obviated by measuring the gradient over a relatively large number of points. Furthermore, the method determines whether or not the maximum shoulder torque has been reached using a relatively easily distinguishable quantity, the gradient of the torque against Turns graph, an acceptable value of which will be considerably larger than that of an unacceptable value.

BRIEF DESCRIPTION OF THE DRAWINGS

The invention will now be described, by way of example only, with reference to the following drawings in which.

DESCRIPTION OF THE PREFERRED EMBODIMENT

Figure 1A:
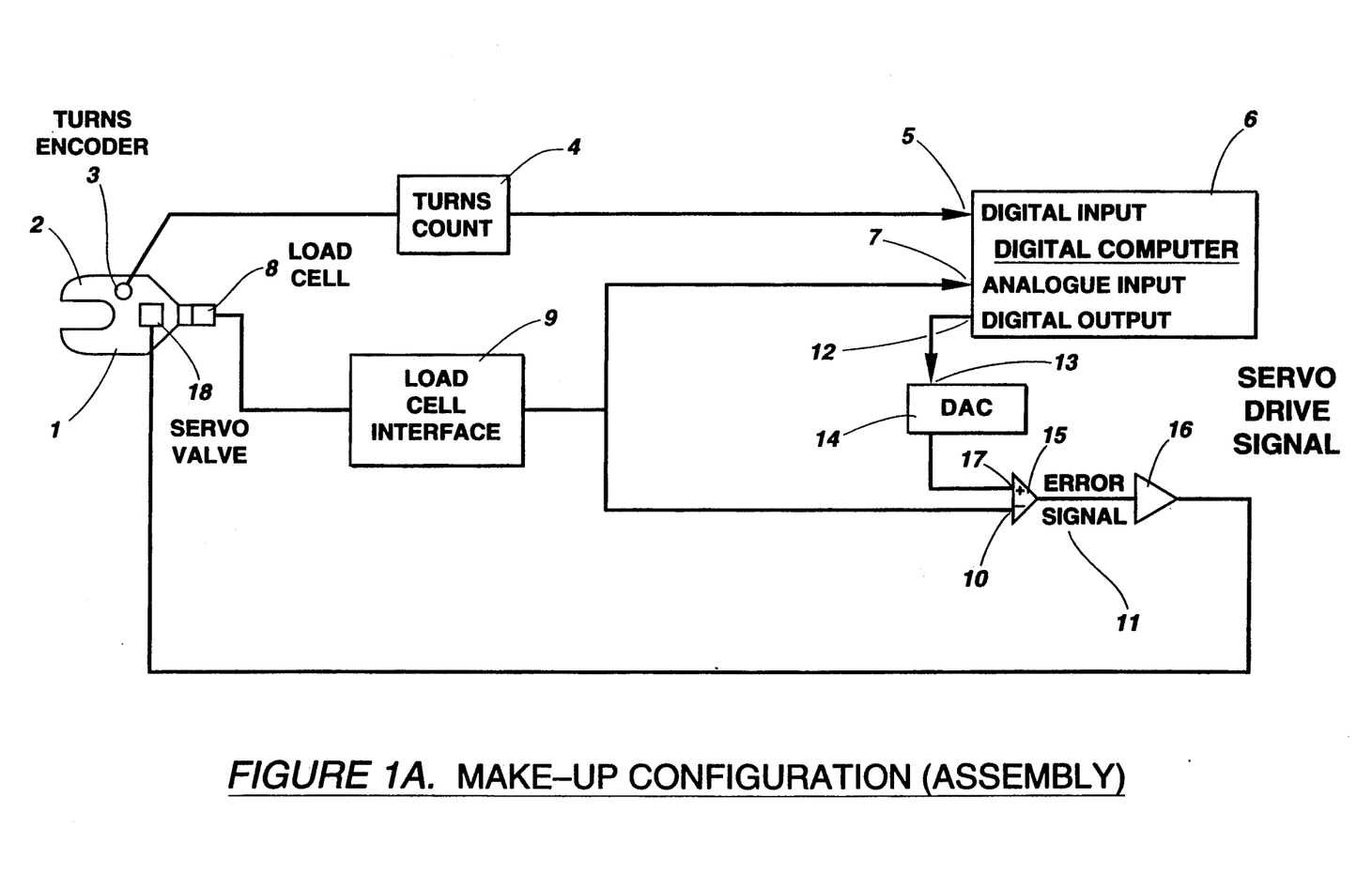
FIGS. 1A and 1B are schematic diagrams showing control systems according to the invention.

Referring to FIG. 1A, in this embodiment the system is used to control a hydraulic motor generally referenced 1, which, in use, drives a set of rotatable jaws (not shown) in an upper tong 2.

The rotatable jaws, in use, grip one of two tubing components which are to be screwed together, whilst the other tubing component is gripped by the jaws of a lower tong (not shown) which is so positioned that the respective screw-threaded portions of the components are in mutual engagement. This arrangement is already known, and used in the screwing together of two tubing components.

As the motor 1 is operated, the rotatable jaws in the tong 2, and thus the component being gripped by the rotatable jaws, are rotated in such a way that the two tubing components are screwed together. As this happens, the rotatable jaws allow the tubing components being gripped by them to move towards the component held in the lower, fixed tong.

In order to counteract the force of reaction against the torque exerted by the motor 1, the tong 2 may be rigidly fixed to the lower tong so that the two tongs cannot rotate relative to one another. Alternatively, where the girth of the components being screwed together is relatively large, the upper tong 2 is conventionally fixed via a wire to a rigid anchoring point on the drilling rig.

A pulse generator 3 is connected to the rotatable jaws, and is so arranged as to generate a pulse signal each time the rotatable jaws rotate through a predetermined angle. In this case, the pulse generator 3 generates one thousand pulses for each revolution of the rotatable jaws (i.e. one pulse per $2\pi/1000$ radians of rotation). The pulses produced by the pulse generator 3 are fed to a counter 4 which counts the number of pulses received from the pulse generator 3, and generates a binary signal representing that number and hence, the total angular displacement of the rotatable jaws. This signal is, in turn, fed to one input 5 of a first processor 6. The processor 6 includes a second input 7, to which a signal representative of the state of the tubing is transmitted.

The representative signal is generated by a load cell 8 which is so mounted that, in use, the load cell 8 measures the reaction in the tong 2 to the torque being exerted by the motor 1. In order to do this, the load cell 8 is appropriately mounted in the link between the tong 2 and the lower tong. Alternatively, in the case where the upper tong is anchored to the rig via a wire, the load cell 8 may be mounted in line with the wire, and be arranged to measure the tension in the wire.

The load cell 8 generates an analogue signal representing the force measured. Since the distance between the load cell 8 and the centre of rotation of the rotatable jaws remains substantially fixed, this signal thus provides an indication of the torque being exerted by the motor 1 acting through the rotatable jaws.

The signal from the load cell 8 is amplified at a load cell interface unit 9, the output of which is connected in parallel to the input 7 of the first processor 6 and an input 10 of a second processor (generally referenced 11).

The input 7 feeds the signal from the unit 9 into an analogue to digital signal convertor forming part of the first processor 6. The signal from the load cell 8 is thus relayed to the first processor 6 in a digital form, and to the input of the second processor 11 in an analogue form.

The first processor 6 comprises a computer which, in use, analyses the signal from the counter 4 to give a measure of the number of revolutions (or fractions of revolutions) which have been completed by the rotatable jaws in the tong 2. The computer also, in use, analyses the signal from the counter 4 using an internal timer, to give a measure of the rotational speed of the rotatable jaws.

Having analysed this data, and the signal at the input 7, the computer generates a first binary control signal at its output 12 in accordance with the programming of the computer.

The first control signal 12 is transmitted to an input 13 of the second processor 11. The second processor 11 comprises a digital to analogue signal convertor 14, the input of which is the input 13, a difference amplifier 15, one input of which is the input 10, the output of the amplifier being connected to a signal amplifier 16.

In use, the convertor 14 converts the first control signal from digital to analogue form, and transmits it to an input 17 of the difference amplifier 15. The difference amplifier 15 thus, in use, provides means comparing the signal from the unit 9 with the first control signal, both signals being analogue signals. The arrangement of the unit 9, processor 6 and convertor 14 is such that both signals have the same voltage scale factor.

The difference amplifier 15 generates a second control signal which is representative of the difference between the two input signals. Thus, if the signal fed into the input 17 is the same as that fed into the input 10, the difference amplifier 15 will generate a signal of zero volts. The signal generated by the difference amplifier 15 is amplified by the amplifier 16 to form a second control signal which is transmitted to control means 18 for the motor 1.

Figure 3:
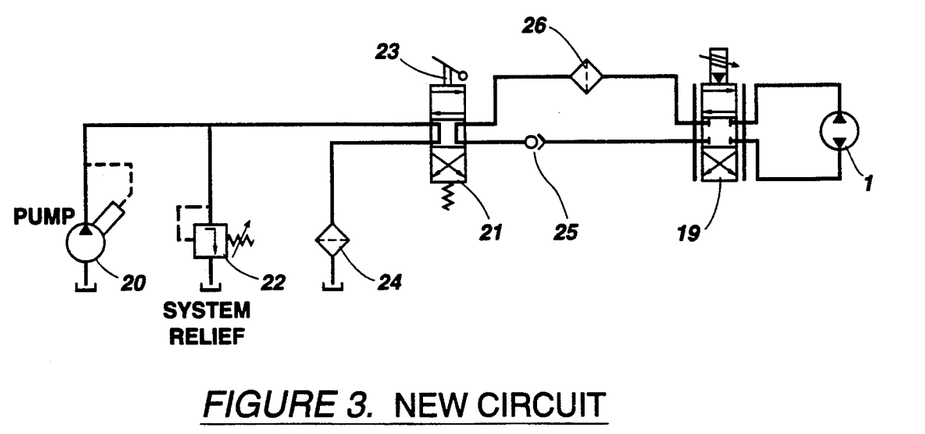
FIG. 3 schematically shows the hydraulic supply circuitry for a hydraulic motor which is to be controlled by the system.

Referring to FIG. 3, the motor 1 is an hydraulic motor, and the control means consequently comprise an electrically actuated hydraulic servo valve 19. The servo valve 19 controls the operation of the motor by controlling the rate of flow of hydraulic fluid through it, and responds to the second control signal in such a way as to open to an extent proportional to the magnitude of the second control signal, the servo valve 19 being closed when the second control signal is of zero volts.

The hydraulic fluid is supplied by a pump 20, the input of which communicates with a reservoir of hydraulic fluid, whilst the output of which is connected to a safety valve 21. A system relief valve 22 is connected across the pump 20, and is operable to release the pressure in the system in the event of the pressure increasing to an unacceptable level.

The safety valve 21 is manually operable, being opened and closed by moving a lever 23 which acts as a "dead man's handle". With the valve 21 closed, hydraulic fluid, in use, supplied by the pump 20 is returned to the reservoir via a filter 24. If the safety valve 21 and the servo valve 19 are open, the pump 20 will supply hydraulic fluid through the valve 21, a one-way valve 25, the servo valve 19 and into the motor 1. Once it has passed through the motor 1, the hydraulic fluid is returned to the reservoir via the servo valve 19, the safety valve 21 and the filter 24.

Where electrical equipment is to be used in environments in which the risk of explosion or fire is high, such as on oil rigs, it is necessary to take precautions to minimise the possibility of the electrical equipment causing fire or explosion. To that end, such equipment may be enclosed in a sealed box which prevents the equipment coming into contact with flammable gases. Where this is not possible, the equipment must be made "intrinsically safe", i.e. the maximum levels of voltage or current passing through the equipment must be within determined safety limits.

In this case, both the processor 6 and 11 are housed in a sealed cabinet, together with the counter 4 and the interface unit 9. The cabinet is pressurised with air so that flammable gas cannot enter. The connections between the equipment housed in the cabinet and the remaining electrical equipment, the load cell 8, the pulse generator 3 and the servo valve 19, are protected by known kinds of current and voltage barrier which ensure that the current and voltage levels in those pieces of equipment do not exceed acceptable levels.

When two section of tubing are to be screwed together, the system operates to control the motor 1, and hence the rotatable jaws in the upper tong 2, in the following way:

with the adjacent tubing string sections appropriately mounted in the lower tong and the upper tong, and with the motor 1 in a high gear, the processor 6 generates a first control signal which is such that the torque exerted by the rotatable jaws gradually increases. During this stage, the processor 6 monitors this increase in torque and checks whether or not the rate of increase corresponds to a proper connection between the tubing string sections. If the tubing string sections are cross-threaded, the rate of increase in torque will be detectably greater than normal, and this will result in the processor 6 shutting down the motor.

If, on the other hand, the rate of increase in torque is of an acceptable level, the processor 6 continues to increase the torque until the rotatable jaws are rotating at a pre-determined speed which the processor 6 can measure. Any change in the torque levels at this stage causes the processor 6 to vary level of the first control signal in such a way as to keep the second control signal, and thus the speed of rotation of the rotatable jaws, substantially constant. If, for example, the torque level increases, the voltage of the signal at the input 17 increases to match, and hence counter the effect of the increase in voltage at the input 10.

This stage continues until the exerted torque reaches a pre-determined level. When this happens, the speed of the motor 1 is gradually reduced to zero, and the operator then changes the motor to a lower gear. If necessary low gear can be selected at the beginning of the process to avoid gear changing.

The processor 6 then generates a first control signal which gradually increases the force applied by the motor, and the speed of rotation of the rotatable jaws is simultaneously monitored by the processor 6 which provides a speed over-ride facility by ensuring that the rotation speed does not exceed a pre-determined value. Once the torque has reached a second pre-determined value, the rate of increase in force applied is reduced so as to give a more accurate control of the applied torque, as a target torque level is approached.

When the target torque level is reached, the system maintains this torque level for a pre-determined period of time, the hold time. During the hold time, the first control signal is held at a substantially constant level, and the second processor 11 consequently varies the second control signal in direct response to any variation in voltage of the signal at the input 10.

It will be appreciated that the system provides two interacting control loops: an analogue control loop in which the signal from the unit 9 passes into the input 10 of the second processor 11; and a digital control loop in which the signal from the unit 9 passes into the input 17 via the first processor 6. During the torque hold stage, the analogue control loop maintains the torque at a substantially constant level, and has a response time which is short enough to compensate for any transient variations in the resistance offered by the tubing components to the applied torque. However, during the earlier stages of the process at which the speed of rotation of the rotatable jaws needs to be controlled, the first processor 6 generates a first control signal which, in effect, controls that speed, over-riding the analogue loop in the process. This is done in order to prevent the analogue loop increasing the flow of hydraulic fluid to the motor 1 if the applied torque suddenly decreases, an effect which could lead to the motor 1 running at an unnacceptably high speed.

Figure 4:
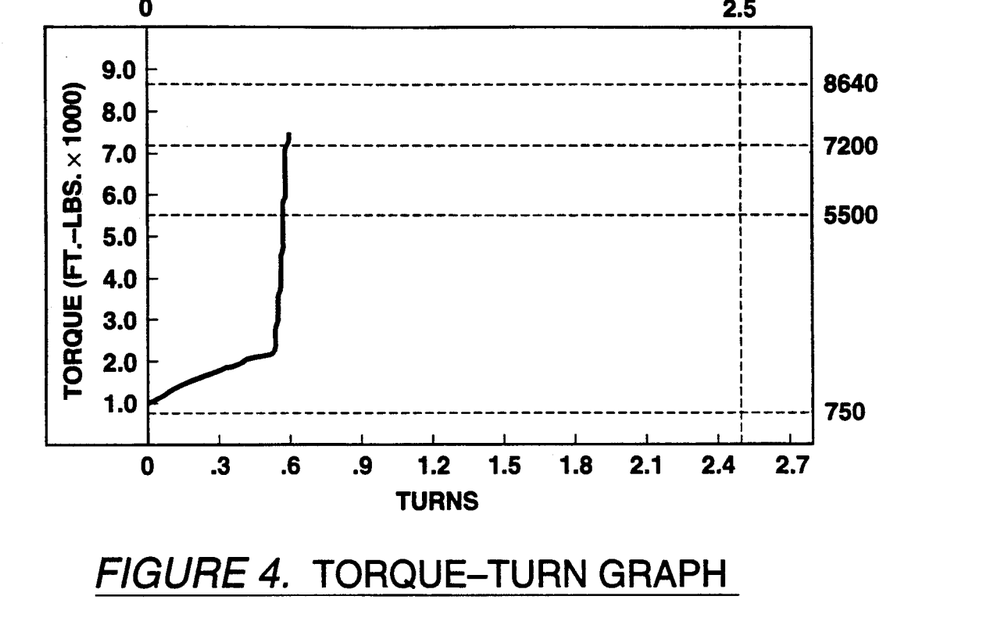
FIG. 4 is a graph of the kind which may be plotted by the system, and which is a plot of torque applied to both members being screwed together against the Turns (i.e. angular displacement) of those members.
Figure 5:
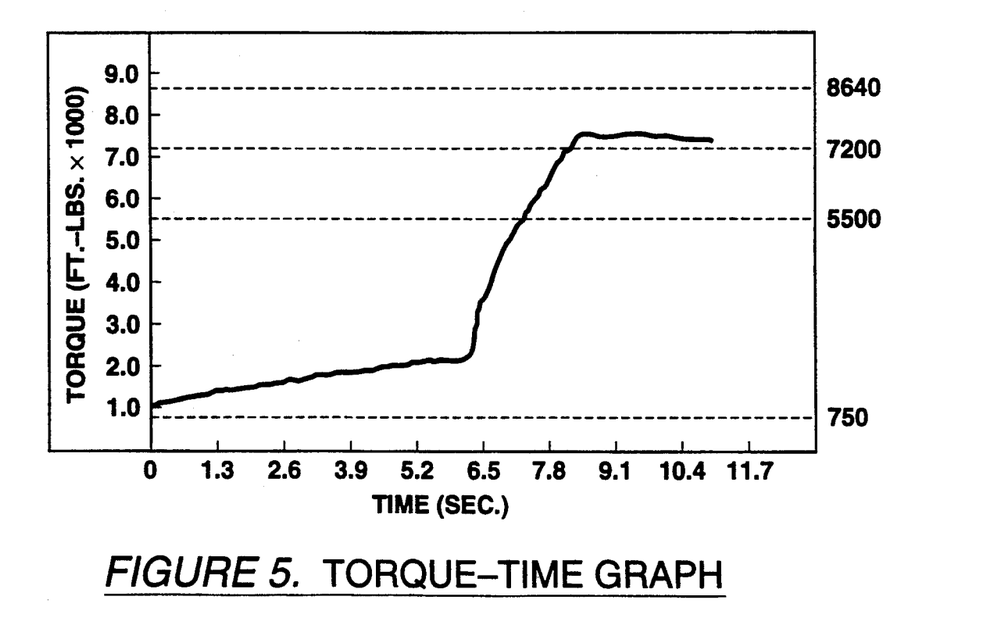
FIG. 5 shows the same torque data, this time plotted on a graph of torque against time.
Figure 6:
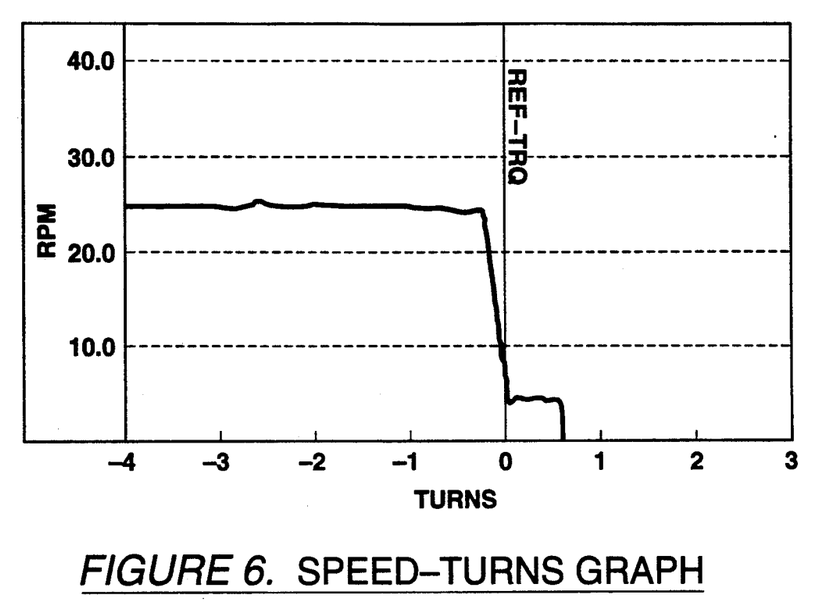
FIG. 6 shows, for the same operation of screwing together two members, a graph of the rotational speed of one member against the angular displacement of that member.

As the torque is gradually increased, i.e. during the penultimate stage of the process just described, the system can check whether or not the maximum shoulder torque has been passed. Referring to FIGS. 4 to 6, a pre-determined torque level, in this case 5,500 FT-LBS, is selected. This level is below the target torque level, which in this case in 7,200 FT-LBS, and is selected as being the level by which the maximum shoulder torque should have been reached.

Referring to FIG. 4, when this torque level is reached, the processor 6 calculates the gradient of the torque against Turn (angular displacement) graph at that torque level using a number of points immediately below that level. The processor 6 thus obtains a measure of the rate of increase of torque with respect to angular displacement.

If this value is above a pre-determined minimum value, this would indicate that the maximum shoulder torque has been passed, and the process continues through to the "torque hold" stage. If the value is not acceptable, the process will be halted, and the operator will then be left with the decision of whether or not to continue.

The minimum gradient is pre-determined in accordance with known previous data.

Since the system causes the motor 1 to gradually apply or remove torque from the components, the problem of kicks occurring in the equipment as the motor is suddenly turned on or off is eliminated. Kicks may be caused by, for example, a sudden dangerous release in tension in the wire anchoring the upper tong 2.

If the motor 1 is replaced with another motor having different operating characteristics, the system includes the facility whereby it may re-calibrate itself. This facility is provided by a re-calibrating programme which is executed by the first processor 6 when no tubing component is being held in the rotatable jaws. The programme generates a first control signal which operates the motor control package 18, causing the motor to rotate the rotatable jaws at a substantially constant speed. The processor 6 measures this speed and uses it to ascertain the relationship between the magnitude of the second control signal and the speed of operation of the motor.

Additionally or alternatively, the system may repeat the process at a number of different motor speeds, or over a range of speeds.

The system may thus be used to control different types of hydraulic motor. The system may also be used to control different types of motor, such as electric motors or pneumatic motors. The re-calibration facility also enables the processor 6 to compensate for changes, caused by, for example, wear of components, to the characteristics of a particular motor.

Figure 1B:
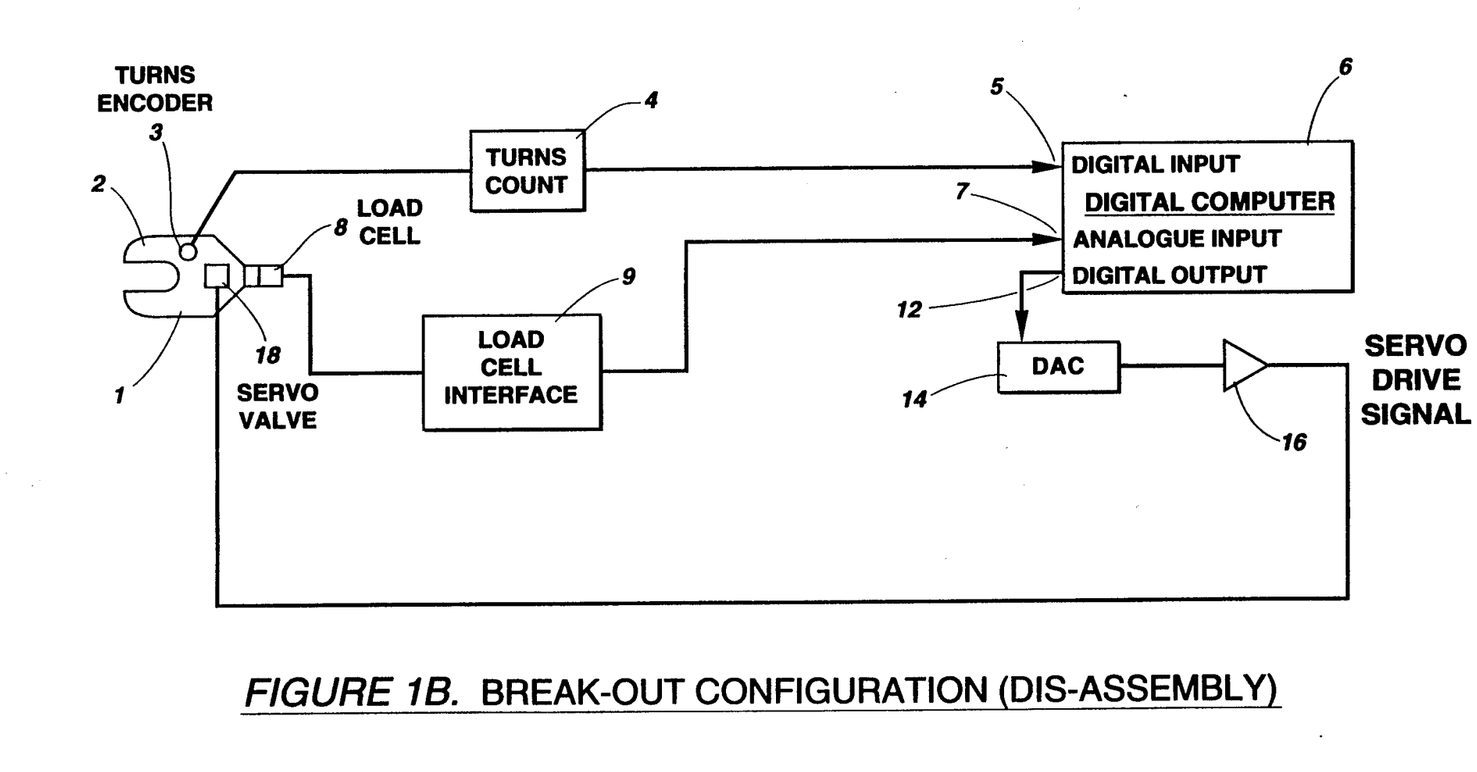
Figure 2:
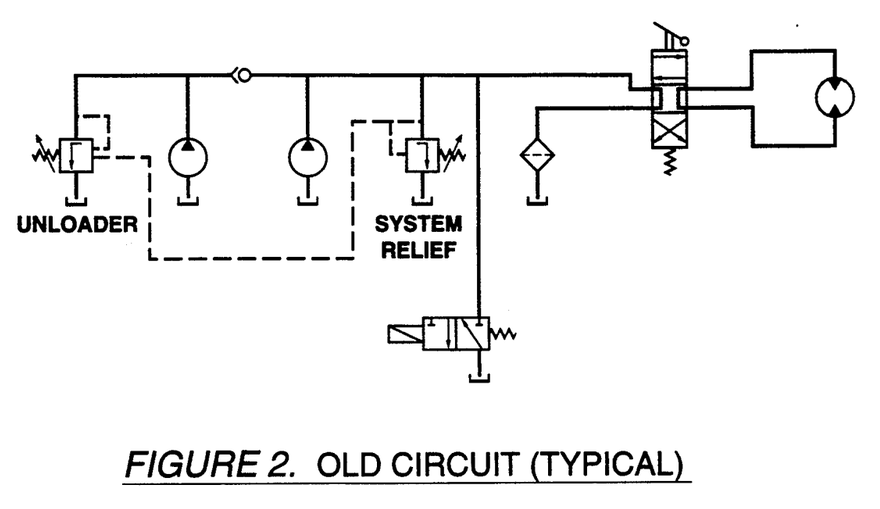
FIG. 2 schematically shows the hydraulic supply circuitry which is conventionally used to supply hydraulic fluid to a hydraulic motor, which is in turn used to screw together two tubing components.
Figure 7:
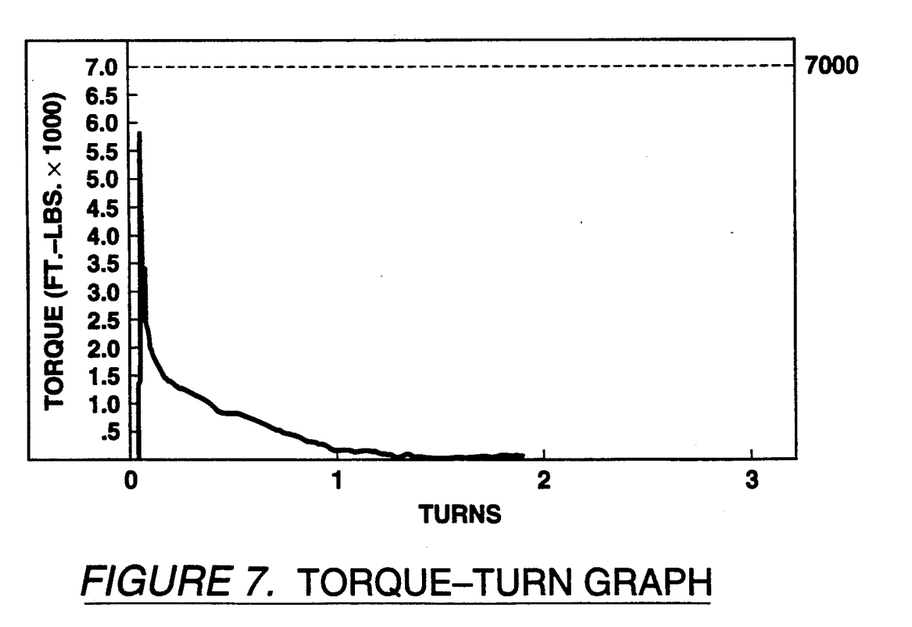
FIGS. 7 and 8 show the unscrewing or disassembly of two members.
Figure 8:
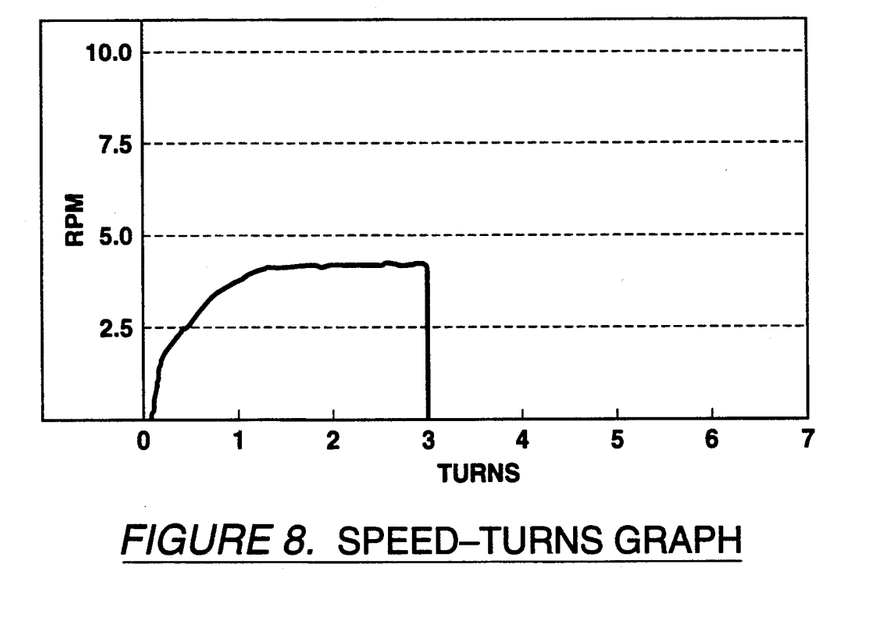

In FIG. 1B the system has been adapted to control the motor so as to unscrew two tubing components. Here the hydraulic supply circuit for the motor is adapted so as to enable the motor to run in reverse, and the processor 6 is programmed to generate a control signal which counteracts positive feedback which would otherwise occur in the analogue loop. In this case the speed of rotation is gradually increased from rest to a pre-determined maximum value. A typical graph is shown in FIG. 7 and FIG. 8. If excessive torque is applied then the torque is reduced to zero to protect the tubing components.

The inventions defined and disclosed herein are clearly so linked as to form part of the same overall inventive concept, which, in its broadest aspect, can be defined as the application of a closed loop control system to the rotational assembly or dis-assembly of two members. It is believed that this concept, when applied specifically to the oil and gas drilling industries, is novel.

I claim:

1. A system for controlling the operation of a motor being used for the rotational assembly or dis-assembly of two operatively inter-engaging threaded members of a threaded tubular connection comprising:
   means for monitoring and generating a torque signal representative of the torque exerted by the motor on one threaded member relative to the other threaded member;
   first processor means and second processor means;
   first relay means for relaying the torque signal to said first processor means;
   second relay means for relaying the torque signal to said second processor mean, wherein said first processor means including a computer which digitally analyzes the torque signal and is programmed as to generate a digital first control signal in response to the torque signal;
   digital-to-analog converter means converting the digital first control signal into an analog signal, said second processor means including means for comparing the analog signal with the torque signal and for generating a second control signal representative of the difference between the analog signal and the torque signal; and
   motor control means connected between said second processor means and the motor, wherein said second processor means transmitting the second control signal to said motor control means for controlling operation of the motor to an extent proportional to the magnitude of the second control signal.

2. A system according to claim 1 additionally including means for measuring and generating a signal representative of the angular position of one of the threaded members, the angular position signal being transmitted to said first processor means.

3. A system according to claim 2, wherein said measuring and generating means includes a turn counter for generating the angular position signal as a digital signal.

4. A system according to claim 2, additionally including means for processing the angular position signals to give a signal representative of the rotational speed of the motor, and wherein said first processor means is programmed to control the rotational speed of one of the threaded members.

5. A system according to claim 1, wherein the motor is a hydraulic motor and said motor control means includes an electrically actuated servo valve.

6. A system according to claim 1, wherein the torque signal is an analog torque signal and said computer includes converter means for converting the analog torque signal into the digital first control signal.

7. A method of controlling a motor having motor control means operable in response to an appropriate control signal and being used for rotational assembly or dis-assembly of two operatively inter-engaging threaded members of a threaded tubular connection, comprising the steps of:

(a) monitoring and generating a torque signal representative of the torque exerted by the motor on one threaded member relative to the other threaded member;
(b) digitally analyzing the torque signal;
(c) generating a first control signal in response to the analysis of the torque signal and in accordance with a pre-determined set of instructions;
(d) converting the torque signal to analog form if the torque signal is not in analog form;
(e) comparing the first control signal with the torque signal and generating a second control signal corresponding to the difference between the first control signal and the torque signal; and
(f) transmitting the second control signal to the motor control means.

8. A method according to claim 7, wherein the motor is used to rotate one threaded member relative to the other threaded member to tighten or loosen said two threaded members, wherein the state of the members is monitored by monitoring the torque exerted by the motor on one threaded member relative to the other threaded member, the method further including the steps of:

(a) generating a signal representative of the relative angular displacement of the threaded members;
(b) digitally analyzing the angular displacement signal; and
(c) generating the first control signal in response to both the digitally analyzed angular displacement signal and the digitally analyzed torque signal.

* * * * *